G. COMRIE.
WIND DEFLECTOR.
APPLICATION FILED APR. 29, 1920.
1,385,485.
Patented July 26, 1921.
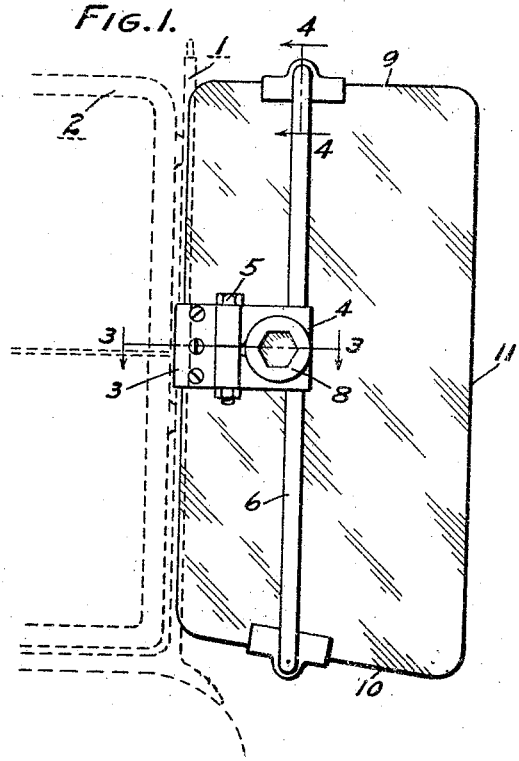
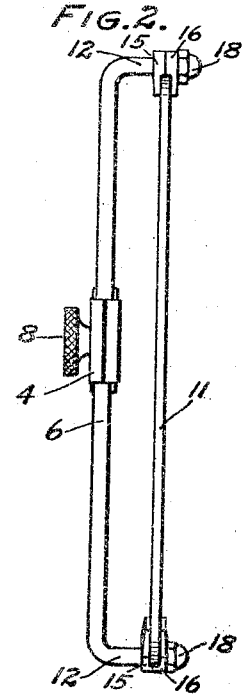
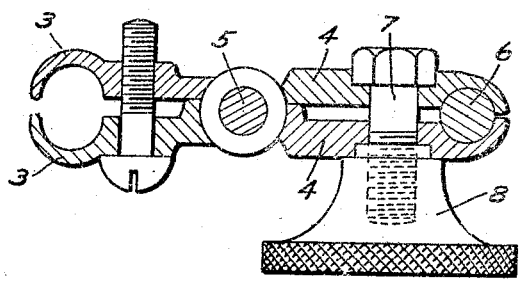
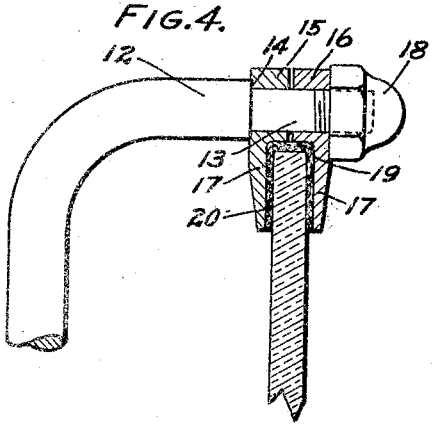
INVENTOR
GUY COMRIE
BY
Hazard & Miller
ATTORNEYS.

UNITED STATES PATENT OFFICE.

GUY COMRIE, OF LOS ANGELES, CALIFORNIA.

WIND-DEFLECTOR.

1,385,485.

Specification of Letters Patent.  Patented July 26, 1921.

Application filed April 29, 1920. Serial No. 377,534.

*To all whom it may concern:*

Be it known that I, GUY COMRIE, a citizen of the United States, residing at Los Angeles, in the county of Los Angeles and State of California, have invented new and useful Improvements in Wind-Deflectors, of which the following is a specification.

This invention is a wind deflector of the type arranged to be positioned at the side edges of a usual wind shield of an automobile.

It is the object of the invention to provide improved clamping means for connecting the wind deflector to its supporting brackets. It is usual in wind deflectors of this type to arrange the upper and lower edges of the deflector along various outwardly diverging lines, and it is the specific object of this invention to provide adjustable clamping connections between the support for the wind deflector and the deflector, which are arranged to be received over the ends of the deflector and snugly clamped thereto irrespective of the angular arrangement of one of said ends relative to the other.

The invention will be readily understood from the following description of the accompanying drawings, in which—

Figure 1 is a front elevation of a wind deflector constructed in accordance with the invention, shown in dotted lines the windshield to which it is attached.

Fig. 2 is an end view of the wind deflector.

Fig. 3 is a transverse section on the line 3—3 of Fig. 1.

Fig. 4 is a longitudinal section on the line 4—4 of Fig. 1.

The improved wind deflector is mounted upon the side frame 1 of the windshield 2 by the usual supporting brackets comprising clamps 3 clamped to the side frame and clamps 4 pivoted upon a vertical axis to clamps 3 by a bolt 5, the clamps 4 being vertically adjustable along a rod 6 as by the bolt 7 provided with a clamping nut 8. The rod 6 extends the height of the wind deflector and is arranged to have its respective ends clamped to the wind deflector at its upper and lower edges. The upper and lower edges of the wind deflector are shown at 9 and 10 as diverging outwardly toward the outer edge 11 of the deflector. For various purposes and in various deflectors the angular relation of these diverging edges of the deflector will vary, and it is therefore necessary that adjustable clamping connections be provided upon rods 6 arranged to be received over the respective edges of the deflector.

As an instance of this arrangement the ends of rods 6 are shown as bent rearwardly over the upper and lower edges of the deflector, as shown at 12, and these bent ends terminate in bolts 13 of reduced diameter so as to form shoulders 14 upon said bent ends.

The clamping connections at the respective ends of rods 6 may comprise clamping plates 15 and 16 pivotally mounted upon the bolt 13 and having off-set portions 17 in the adjacent surfaces thereof forming a recess 19 in which the edge of the deflector is adapted to be received. A nut 18 is provided upon the end of bolt 13 by tightening which the clamps 15 and 16 may be forced against shoulder 14 so as to clamp the edge of the deflector between the clamps and also to clamp the clamps against pivotal movement upon bolt 13. If desired a packing 20 may be interposed between the surfaces of the wind deflector and the walls of recesses 19.

By this arrangement it will be seen that when the rod 6 is being connected to the wind deflector and the nuts 18 are loosened, the clamps may be swung upon their pivots so that the clamping connections at the respective ends of the rod 6 may be adjusted according to the angular relation of the respective ends of the deflector to cause the ends of the deflector to fit snugly against the bases of the recesses 19.

The construction, as thus described, provides efficient adjustable clamping connections arranged to be received over the ends of wind deflectors having diverging upper and lower edges, the clamping connections being adapted to form snug connections irrespective of the variations in the angular relations of the edges of the deflector.

Various changes may be made without departing from the spirit of the invention as claimed.

What is claimed is:

A wind deflector, comprising a shield member, a rod extending lengthwise of said shield member and having its ends bent over the ends of said shield member, said ends having reduced end portions, clamping members pivoted upon said reduced end portions and adapted to engage opposite surfaces of the edges of the shield member, retaining nuts threaded upon the reduced end portions and arranged to clamp said clamping members against said shield, and means for supporting said rod from the windshield of a motor vehicle.

In testimony whereof I have signed my name to this specification.

GUY COMRIE.